(12) United States Patent
Ando et al.

(10) Patent No.: US 11,959,815 B2
(45) Date of Patent: Apr. 16, 2024

(54) STRESS SENSOR AND MANUFACTURING METHOD THEREFOR

(71) Applicants: Murata Manufacturing Co., Ltd., Nagaokakyo (JP); The University of Tokyo, Tokyo (JP)

(72) Inventors: Akira Ando, Nagaokakyo (JP); Daichi Chiba, Tokyo (JP)

(73) Assignees: MURATA MANUFACTURING CO., LTD., Nagaokakyo (JP); THE UNIVERSITY OF TOKYO, Tokyo (JP)

( * ) Notice: Subject to any disclaimer, the term of this patent is extended or adjusted under 35 U.S.C. 154(b) by 456 days.

(21) Appl. No.: 17/329,675

(22) Filed: May 25, 2021

(65) Prior Publication Data

US 2021/0278292 A1    Sep. 9, 2021

Related U.S. Application Data

(63) Continuation of application No. PCT/JP2019/046917, filed on Nov. 29, 2019.

(30) Foreign Application Priority Data

Jan. 30, 2019 (JP) .................................. 2019-014792

(51) Int. Cl.
  *G01L 1/12*  (2006.01)
  *H01F 10/32* (2006.01)
  *H01F 41/30* (2006.01)

(52) U.S. Cl.
  CPC ............ *G01L 1/12* (2013.01); *H01F 10/3272* (2013.01); *H01F 41/302* (2013.01)

(58) Field of Classification Search
  CPC ....... G01L 1/12; H01F 10/3272; H01F 41/302
  See application file for complete search history.

(56) References Cited

U.S. PATENT DOCUMENTS 9,853,209 B2    12/2017  Fuji et al.
2002/0073785 A1   6/2002  Prakash
(Continued)

FOREIGN PATENT DOCUMENTS

JP    2002357489 A   12/2002
JP    2009042178 A    2/2009
(Continued)

OTHER PUBLICATIONS

International Search Report issued for PCT/JP2019/046917, dated Jan. 28, 2020.
(Continued)

*Primary Examiner* — Peter J Macchiarolo
*Assistant Examiner* — John M Royston
(74) *Attorney, Agent, or Firm* — Arentfox Shiff LLP

(57) ABSTRACT

Disclosed herein is a stress sensor that includes a stress detection layer including a laminated body including a first ferromagnetic layer, a first non-magnetic layer, a second ferromagnetic layer, and an antiferromagnetic layer stacked one on another. The antiferromagnetic layer includes Mn, and the magnetization direction of the second ferromagnetic layer is fixed by the exchange bias caused by the exchange coupling with the antiferromagnetic layer. The stress sensor detects a stress by an electric resistance depending upon a relative angle between magnetization directions of the first ferromagnetic layer and the second ferromagnetic layer, the relative angle changing depending upon an externally applied stress.

19 Claims, 13 Drawing Sheets

(56) References Cited

U.S. PATENT DOCUMENTS

| | | |
|---|---|---|
| 2015/0268116 A1 | 9/2015 | Fuji et al. |
| 2016/0009545 A1* | 1/2016 | Fuji .................. G01L 9/0044 |
| | | 257/419 |
| 2017/0059424 A1* | 3/2017 | Yuzawa ............... G01L 1/2206 |
| 2018/0076385 A1 | 3/2018 | Fuji et al. |
| 2019/0360878 A1 | 11/2019 | Chiba et al. |

FOREIGN PATENT DOCUMENTS

| | | |
|---|---|---|
| JP | 2015179772 A | 10/2015 |
| WO | 2018151083 A1 | 8/2018 |

OTHER PUBLICATIONS

Written Opinion of the International Search Authority issued for PCT/JP2019/046917, dated Jan. 28, 2020.

* cited by examiner

STRESS SENSOR AND MANUFACTURING METHOD THEREFOR

CROSS-REFERENCE TO RELATED APPLICATIONS

The present application is a continuation of International Application No. PCT/JP2019/046917, filed on Nov. 29, 2019, which claims priority to Japanese Application No. 2019-014792, filed on Jan. 30, 2019, the entire contents of each of which are incorporated herein by reference.

TECHNICAL FIELD

The present disclosure relates to a stress sensor and a manufacturing method therefor.

BACKGROUND

Conventionally, a stress sensor detects stress in terms of the change in a resistance value correlated to a deformation amount of an element corresponding to the magnitude of the stress.

Patent Publication No. WO 2018/151083 A1, for example, discloses a stress sensor capable of detecting the vector direction of a stress. The disclosed stress sensor has a stress detection layer with a laminated body including a first magnetic layer, a first non-magnetic layer, and a second magnetic layer stacked one on another. Here, the first magnetic layer and the second magnetic layer have mutually different magnetoelastic coupling constants. This stress sensor detects the stress by an electric resistance depending upon the relative angle between the magnetization directions of the first magnetic layer and the second magnetic layer, which changes depending upon the externally applied stress. Furthermore, the publication discloses a stress sensor in which one of the first magnetic layer and the second magnetic layer is a strain insensitive layer, showing a small change in the magnetization direction depending upon the externally applied stress, and the other is a strain sensitive layer showing a large change in the magnetization direction depending upon the externally applied stress.

However, with the stress sensor according to the publication, application of a strain may make it difficult for the single domain state of the strain insensitive layer to be kept. When an auxiliary magnetic field is applied in order to stabilize the single domain state of the strain insensitive layer, the magnetization direction of the strain sensitive layer may become less likely to be changed under the influence of the auxiliary magnetic field. In these cases, the change in the relative angle of the magnetization direction with respect to the strain direction becomes unstable, undesirably resulting in the reduction of operation stability.

SUMMARY

To address the shortcomings of conventional stress sensors, the present disclosure describes a stress sensor with improved operation stability, and a manufacturing method of said stress sensor.

In an exemplary aspect, a stress sensor in accordance with one aspect of the present disclosure includes a stress detection layer including a laminated body including a first ferromagnetic layer, a first non-magnetic layer, a second ferromagnetic layer, and an antiferromagnetic layer stacked one on another. The antiferromagnetic layer includes Mn. The magnetization direction of the second ferromagnetic layer is fixed by an exchange bias caused by an exchange coupling with the antiferromagnetic layer. The stress sensor detects a stress by the electric resistance depending upon the relative angle between magnetization directions of the first ferromagnetic layer and the second ferromagnetic layer, the relative angle changing depending upon the externally applied stress.

In some aspects, the magnetization directions of the first ferromagnetic layer and the second ferromagnetic layer are arrayed in parallel or antiparallel with each other in an initial state in which stress is not applied.

In some aspects, the electric resistance increases when the magnetization directions of the first ferromagnetic layer and the second ferromagnetic layer changes from parallel to antiparallel.

In some aspects, the stress detection layer further includes a third ferromagnetic layer, a second non-magnetic layer, and a fourth ferromagnetic layer, in addition to the laminated body, and a magnetization direction of the third ferromagnetic layer is fixed by an exchange bias caused by an exchange coupling with the antiferromagnetic layer.

In some aspects, the stress sensor further includes a substrate for supporting the stress detection layer.

In some aspects, the substrate is a flexible substrate.

In some aspects, the first ferromagnetic layer is provided on a substrate side of the first non-magnetic layer, and the second ferromagnetic layer and the antiferromagnetic layer are provided on an opposite side of the substrate side of the first non-magnetic layer.

In some aspects, the first ferromagnetic layer and the second ferromagnetic layer comprise a metal magnetic body.

In some aspects, the first ferromagnetic layer and the second ferromagnetic layer comprise Fe, Co, or Ni, or an alloy including at least one of Fe, Co, and Ni.

In some aspects, the first non-magnetic layer comprises a metal or an insulator, or a combination thereof.

In some aspects, the electric resistance is detected by a magnitude of a detection current flowing into all layers of the stress detection layer.

In some aspects, the detection current is fed through a first electrode and a second electrode on the stress sensor by applying a voltage across the first electrode and the second electrode.

In some aspects, a protective layer is stacked on the stress detection layer and the first and second electrode are provided on the protective layer.

In some aspects, the stress detection layer is stacked on a base layer and a protective layer is stacked on the stress detection layer, wherein the first electrode is formed on the protective layer and the second electrode is formed on the base layer.

A manufacturing method for the stress sensor in accordance with another aspect of the present disclosure includes annealing at least a second ferromagnetic layer and an antiferromagnetic layer of the stress sensor in a magnetic field, wherein performing the annealing in the magnetic field comprises: heat treating the second ferromagnetic layer and the antiferromagnetic layer in the magnetic field, cooling the second ferromagnetic layer and the antiferromagnetic layer to room temperature in the magnetic field, forming an exchange coupling between the second ferromagnetic layer and the antiferromagnetic layer, and fixing a magnetization direction of the second ferromagnetic layer by an exchange bias caused by the exchange coupling, and wherein the stress sensor detects a stress by an electric resistance depending upon a relative angle between magnetization directions of a first ferromagnetic layer and the second ferromagnetic layer, the relative angle changing depending upon an externally applied stress.

In some aspects, the manufacturing method further comprises depositing the first ferromagnetic layer, a non-magnetic layer, the second ferromagnetic layer, and the antiferromagnetic layer over a flexible substrate, and wherein when performing the annealing in the magnetic field, the flexible substrate is annealed together with the second ferromagnetic layer and the antiferromagnetic layer.

In some aspects, the first ferromagnetic layer, the non-magnetic layer, the second ferromagnetic layer, and the antiferromagnetic layer together comprise a stress detection layer. The manufacturing method further comprises forming a base layer between the flexible substrate and the stress detection layer, forming a protective layer on the stress detection layer, and forming a first electrode and a second electrode on the protective layer, wherein the electric resistance is detected by a magnitude of a detection current flowing into all layers of the stress detection layer via the first electrode and the second electrode.

In some aspects, annealing in the magnetic field further comprises heat treating the second ferromagnetic layer and the antiferromagnetic layer to a treatment temperature, and holding the second ferromagnetic layer and the antiferromagnetic layer at the treatment temperature for a treatment time.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and form a part of this specification, illustrate one or more example aspects of the present disclosure and, together with the detailed description, serve to explain their principles and implementations.

DETAILED DESCRIPTION

Figure 1:
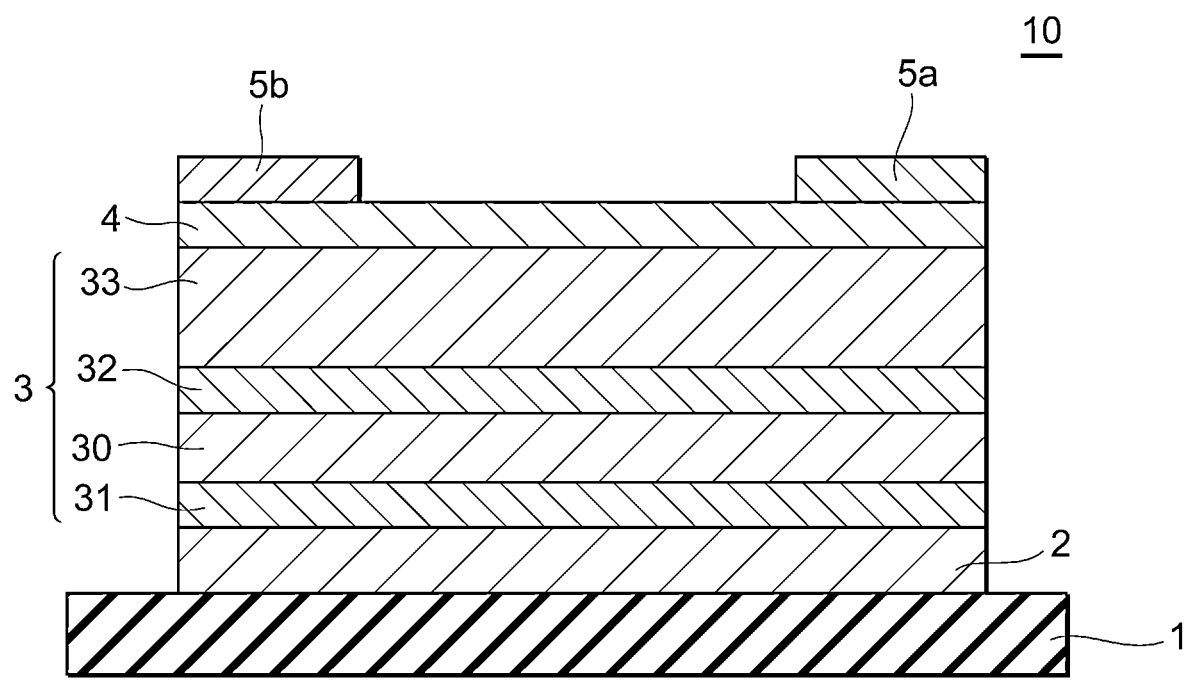
FIG. 1 is a cross sectional view schematically showing a configuration of a stress sensor in accordance with a first embodiment.

Embodiments of the present disclosure will be described by reference to the accompanying drawings. In the following description of the drawings, the same or similar constituent elements are indicated with the same or similar reference numerals and signs. The drawings are examples, and the dimensions and the shape of each part are schematic, and the technical scope of the present disclosure should not be construed as being limited to the embodiments.

First Embodiment

Referring to FIG. 1, a description will be given to a configuration of a stress sensor 10 in accordance with a first embodiment of the present disclosure. FIG. 1 is a cross sectional view schematically showing the configuration of the stress sensor in accordance with the first embodiment.

As shown in FIG. 1, the stress sensor 10 includes a substrate 1, a base layer 2 formed on the substrate 1, a stress detection layer 3 formed on the base layer 2, a protective layer 4 formed on the stress detection layer 3, and an electrode 5a and an electrode 5b provided on the protective layer 4, and at positions separated from each other.

The substrate 1 includes a resin substrate. In some aspects, if a flexible substrate having flexibility and elasticity is used, the sensor can be put to use as a sensor for sensing the movement of the human body. As such, a flexible substrate may include polyester, polycarbonate, or polyimide. In some aspects, the substrate 1 has a high heat resistance from the viewpoint of the feasibility of annealing of the stress detection layer 3. In some aspects, the substrate 1 has a high flatness from the viewpoint of improving the crystal orientation of each layer of the stress detection layer 3, and from the viewpoint of improving the flatness of the interface of respective layers.

The base layer 2 is required to determine the crystal orientation of the stress detection layer 3, and to enhance the adhesion between the stress detection layer 3 and the substrate 1, and to be a non-magnetic body. For example, the base layer 2 includes Pt, Cu, Ta, or Au of a 3d, 4d, or 5d transition metal non-magnetic body. The base layer 2 may be a lamination of different kinds of metal layers. Furthermore, in the case of a configuration in which the detection current is not required to pass through the base layer 2, the base layer 2 may include an insulator, and may be, for example, silicon oxide, silicon nitride, aluminum oxide, or magnesium oxide.

The stress detection layer 3 includes a laminated body including a first ferromagnetic layer 31, a first non-magnetic layer 30, a second ferromagnetic layer 32, and an antiferromagnetic layer 33 sequentially from the substrate 1 side (lower layer). Incidentally, the stress detection layer 3 may include layers not shown in FIG. 1 such as a layer for intensifying the exchange bias magnetic field (Heb) to be applied on the second ferromagnetic layer 32 by the lamination layer of the second ferromagnetic layer 32 and the antiferromagnetic layer 33, a layer for weakening the interlayer coupling magnetic field (Hin) between the first ferromagnetic layer 31 and the second ferromagnetic layer 32, and a layer for increasing the change ratio of the electric resistance depending upon the relative angle between the magnetization directions of the first ferromagnetic layer 31 and the second ferromagnetic layer 32. The layers not shown may be provided in the outside of the laminated body, and may be provided in the inside of the laminated body, namely, between layers of the first ferromagnetic layer 31 and the first non-magnetic layer 30, between layers of the first non-magnetic layer 30 and the second ferromagnetic layer 32, or between layers of the second ferromagnetic layer 32 and the antiferromagnetic layer 33.

In some aspects, the film thickness of each layer of the stress detection layer 3 is set at 30 nm or less. By setting the film thickness of each layer as thin as 30 nm or less, the stress detection layer 3 can expand and contract due to the presence of a stress, and can exhibit a characteristic of being restored to the original state without a stress.

The first ferromagnetic layer 31 and the second ferromagnetic layer 32 have mutually different magnetoelastic coupling constants B. The magnetization directions (orientations of the magnetic moment) of the first ferromagnetic layer 31 and the second ferromagnetic layer 32 are arrayed in parallel or antiparallel with each other in the initial state in which no stress is applied. In other words, the angle formed between the magnetization direction of the first ferromagnetic layer 31 and the magnetization direction of the second ferromagnetic layer 32 (which will be hereinafter referred to as the "relative angle between the magnetization directions") is 0° or 180° in the initial state. However, the relative angle between the magnetization directions in the initial state is not limited to the foregoing, and may be more than 0° and smaller than 180°.

The first ferromagnetic layer 31 is a strain sensitive layer, and the second ferromagnetic layer 32 is a strain insensitive layer. The strain insensitive layer is the layer substantially not changing in magnetization direction of the strain insensitive layer even when applied with a stress (strain), and the strain sensitive layer denotes the layer whose magnetization directions of the strain sensitive layer directed in parallel with or perpendicular to the strain direction when applied with a stress (strain). When the magnetoelastic coupling constant B is positive, the magnetization direction of the strain sensitive layer is directed in parallel with the strain direction. When the magnetoelastic coupling constant B is negative, the magnetization direction of the strain sensitive layer is directed perpendicularly with respect to the strain direction. When defined from the relative value to the strain sensitive layer, for the strain insensitive layer, the absolute value of the magnetoelastic coupling constant B is sufficiently smaller than that of the strain sensitive layer. In some aspects, the absolute value of the magnetoelastic coupling constant B of the strain insensitive layer is defined as 1/5 or less of the absolute value of the magnetoelastic coupling constant B of the strain sensitive layer. Furthermore, when defined from the absolute value of the magnetoelastic coupling constant B, the absolute value of the magnetoelastic coupling constant of the strain insensitive layer is substantially 0, and specifically, 0.5 MJ/m$^3$ or less, further 0.4 MJ/m$^3$ or less, further, 0.3 MJ/m$^3$ or less, further 0.2 MJ/m$^3$ or less, and further 0.1 MJ/m$^3$ or less, and is preferably close to 0 as much as possible. Furthermore, the absolute value of the magnetoelastic coupling constant B of the strain sensitive layer is 1 MJ/m$^3$ or more. Incidentally, the stresses (strains) include various stresses such as tension, compression, and flexion.

The magnetic layers including the first ferromagnetic layer 31 and the second ferromagnetic layer 32 each include a ferromagnetic body of a metal (including an alloy), and in some aspects include a 3d transition metal such as Fe, Co, or Ni, or an alloy (3d transition metal alloy) including at least one of Fe, Co, and Ni. The first ferromagnetic layer 31 and the second ferromagnetic layer 32 may include different kinds of metal magnetic layers stacked one on another, respectively.

The first ferromagnetic layer 31 and the second ferromagnetic layer 32 may include the same magnetic material, or may include different magnetic materials. Furthermore, the first ferromagnetic layer 31 and the second ferromagnetic layer 32 may have the same thickness or may have different thicknesses. In some aspects, when another ferromagnetic layer (e.g., a third ferromagnetic layer described later) is included, the other ferromagnetic layer may include the same material as that for the first ferromagnetic layer 31 or the second ferromagnetic layer 32, or may include a different material from that for the first ferromagnetic layer 31 and the second ferromagnetic layer 32. Furthermore, the other ferromagnetic layer may have the same thickness as that of the first ferromagnetic layer 31 or the second ferromagnetic layer 32, or may have a different thickness from that of the first ferromagnetic layer 31 and the second ferromagnetic layer 32.

The antiferromagnetic layer 33 fixes the magnetization direction of the second ferromagnetic layer 32 by the exchange bias caused by the exchange coupling with the second ferromagnetic layer 32. In other words, the second ferromagnetic layer 32 is applied with an exchange bias magnetic field (Heb). The exchange bias is insensitive to strain. For this reason, the lamination of the second ferromagnetic layer 32 and the antiferromagnetic layer 33 resultantly makes the second ferromagnetic layer 32 strain-insensitive. Therefore, the second ferromagnetic layer 32 can be caused to function as a strain insensitive layer even when set to have the material or shape/dimensions which would result in the impartment of the magnetoelastic coupling constant B equal to, or larger than that of the first ferromagnetic layer 31 without the presence of the antiferromagnetic layer 33.

The antiferromagnetic layer 33 includes an antiferromagnetic body including manganese (Mn), and preferably includes a Mn alloy such as FeMn, IrMn, or PtMn. Incidentally, in the case of the configuration in which the detection current is not required to pass through the antiferromagnetic layer 33 as with a seventh embodiment described later, the material for the antiferromagnetic layer 33 is not limited to a metal (alloy), and may be an insulator.

The first non-magnetic layer 30 may only be a non-magnetic body, and includes a 3d, 4d, or 5d transition metal non-magnetic body such as Pt, Cu, Ta, Au, Cr, or Ag. Furthermore, the first non-magnetic layer 30 may be an insulator, and may include, for example, silicon oxide, silicon nitride, aluminum oxide, or magnesium oxide. The thickness of the first non-magnetic layer 30 is 10 nm or less. In some aspects, when another non-magnetic layer (e.g., a second non-magnetic layer described later) is included, the other non-magnetic layer may include the same material as, or a different material from that for the first non-magnetic layer 30.

The protective layer 4 may be the one for protecting the stress detection layer 3, and may only be a non-magnetic body. For example, the protective layer 4 includes Pt, Cu, Ta, Au, or Ru of a 3d, 4d, or 5d transition metal non-magnetic body. The protective layer 4 may include different kinds of metal layers stacked one on another. In some aspects, when the detection current does not pass through the protective layer 4 as with a seventh embodiment described later, the protective layer 4 may include an insulator, and may include, for example, silicon oxide, silicon nitride, aluminum oxide, or magnesium oxide.

The material for the electrode 5a or 5b has no restriction, and a metal including, for example, Pt, Cu, Ag, Au, Al, Cr, or Ti, or an electric conductor including the metal is used. A current is fed through the electrodes 5a and 5b to the stress detection layer 3, so that the electric resistance value of the stress detection layer 3 is detected. In the present embodiment, a voltage is applied across the electrode 5a and the electrode 5b formed apart from each other at the top of the stress detection layer 3, which resultantly causes a current to flow into all the layers of the stress detection layer. Accordingly, the giant magnetoresistance effect described later can be detected.

Figure 2:
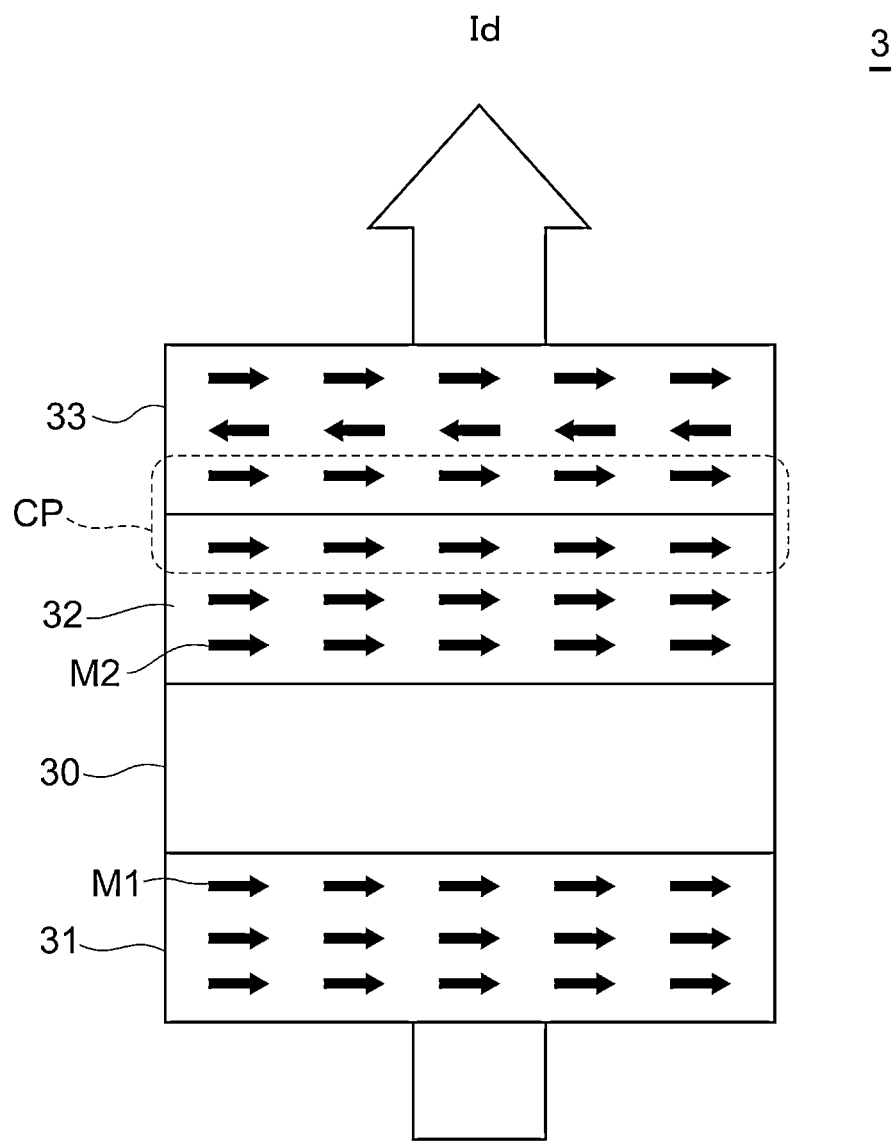
FIG. 2 is a cross sectional view schematically showing one example of the magnetization direction in a low resistance state.
Figure 3:
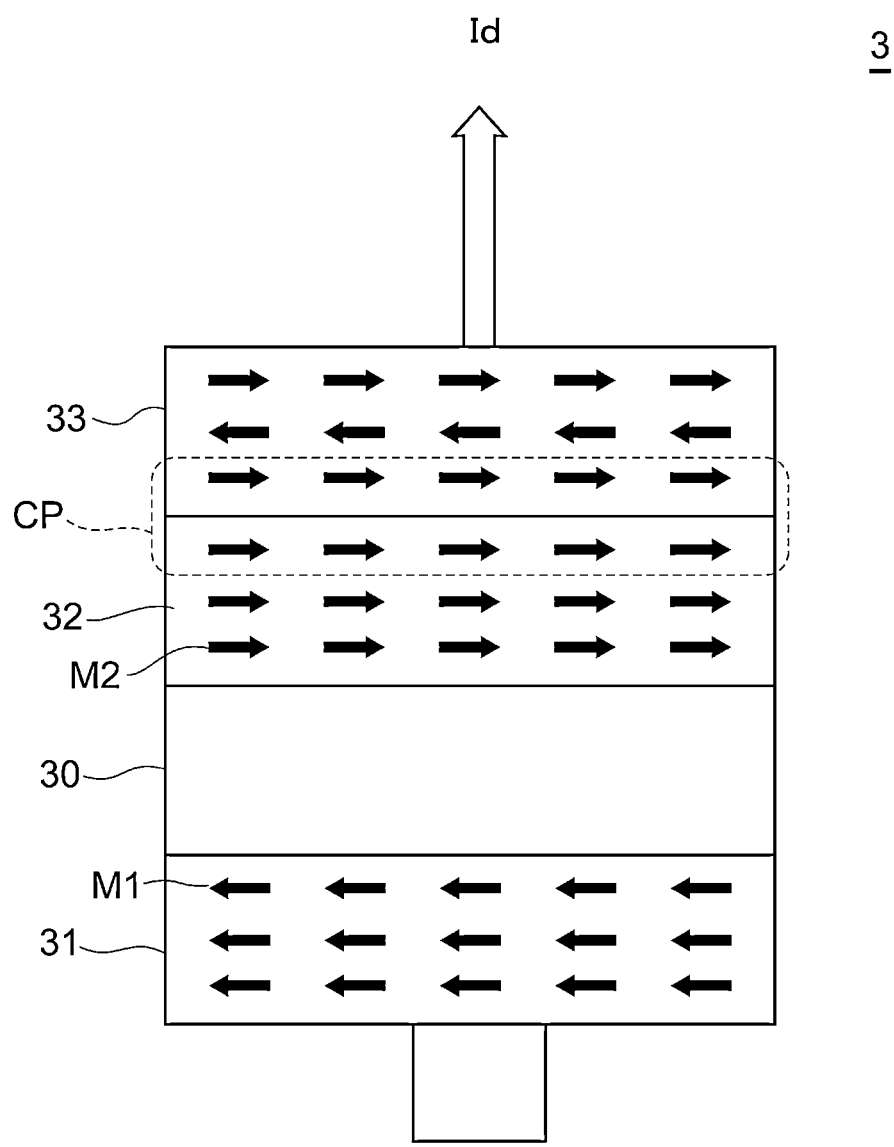
FIG. 3 is a cross sectional view schematically showing one example of the magnetization direction in a high resistance state.

Then, referring to FIGS. 2 and 3, a description will be given to the relationship between the relative angle between the magnetization directions of the first ferromagnetic layer 31 and the second ferromagnetic layer 32, and the electric resistance. FIG. 2 is a cross sectional view schematically showing one example of the magnetization directions in the low resistance state. FIG. 3 is a cross sectional view schematically showing one example of the magnetization directions in the high resistance state.

The magnetization direction (magnetic moment) of the first ferromagnetic layer 31 is referred to as M1, and the magnetization direction (magnetic moment) of the second ferromagnetic layer 32 is referred to as M2. The magnetizations of the mutually opposed surfaces of the second ferromagnetic layer 32 and the antiferromagnetic layer 33 form the exchange coupling CP. The lamination of the antiferromagnetic layer 33 and the second ferromagnetic layer 32 fixes the magnetization direction M2 of the second ferromagnetic layer 32 in one direction according to the exchange bias magnetic field (Heb) applied on the second ferromagnetic layer 32.

As shown in FIG. 2, when the magnetization direction M1 and the magnetization direction M2 are arrayed in parallel with each other, and the relative angle between the magnetization directions of the first ferromagnetic layer 31 and the second ferromagnetic layer 32 (the angle formed by M1 and M2) is 0°, the stress detection layer 3 is put in a low resistance state. Furthermore, as shown in FIG. 3, when the magnetization direction M1 and the magnetization direction M2 are arrayed in antiparallel with each other, and the relative angle between the magnetization directions of the first ferromagnetic layer 31 and the second ferromagnetic layer 32 (the angle formed by M1 and M2) is 180°, the stress detection layer 3 is put in a high resistance state.

With the stress sensor 10 in accordance with the present embodiment, the electric resistance value of the stress detection layer 3 is detected by the magnitude of the detection current Id flowing into all the layers of the stress detection layer 3. The electric resistance value changes according to the relative angle between the magnetization directions of the first ferromagnetic layer 31 and the second ferromagnetic layer 32. In the case of the low resistance state in which the relative angle between the magnetization directions of the first ferromagnetic layer 31 and the second ferromagnetic layer 32 becomes 0° as shown in FIG. 2, the interface scattering of electrons between the first ferromagnetic layer 31 and the second ferromagnetic layer 32 is reduced, so that the magnitude of the detection current Id is maximized (the electric resistance value is minimized). In the case of the high resistance state in which the relative angle between the magnetization directions of the first ferromagnetic layer 31 and the second ferromagnetic layer 32 becomes 180° as shown in FIG. 3, the interface scattering of electrons between the first ferromagnetic layer 31 and the second ferromagnetic layer 32 increases, so that the magnitude of the detection current Id is minimized (the electric resistance value is maximized). In the case of the intermediate state in which the relative angle between the magnetization directions of the first ferromagnetic layer 31 and the second ferromagnetic layer 32 is larger than 0° and smaller than 180°, the magnitude of the detection current Id is the value larger than that in the low resistance state, and smaller than that in the high resistance state, and becomes the value depending upon the relative angle between the magnetization directions. Thus, the electric resistance value of the stress detection layer 3 becomes a value varying according to the relative angle between the magnetization directions of the first ferromagnetic layer 31 and the second ferromagnetic layer 32. This is the so-called giant magnetoresistance effect (Nobel Prize in Physics in 2007). The stress sensor 10 in accordance with the present embodiment uses the giant magnetoresistance effect.

As one example, it is designed such that the magnetization direction M1 of the first ferromagnetic layer 31 is arrayed in parallel with (in the low resistance state of FIG. 2), or arrayed in antiparallel (in the high resistance state of FIG. 3) with the magnetization direction M2 of the second ferromagnetic layer 32 in the initial state. When a stress acts on the in-plane of the stress sensor 10 in this state, the magnetization direction M2 of the second ferromagnetic layer 32 fixed by the strain-insensitive exchange bias caused by the exchange coupling with the antiferromagnetic layer 33 is stable, and does not change. In contrast, the magnetization direction M1 of the first ferromagnetic layer 31 sensitively reacts to the strain, and changes. Specifically, the magnetization direction M1 of the first ferromagnetic layer 31 is arrayed in parallel with the strain direction (elongation direction) of the first ferromagnetic layer 31 when the magnetoelastic coupling constant B is positive, and is arrayed perpendicularly to the strain direction (elongation direction) of the first ferromagnetic layer 31 when the magnetoelastic coupling constant B is negative. Namely, the relative angle between the magnetization directions of the first ferromagnetic layer 31 and the second ferromagnetic layer 32 changes depending upon the stress direction, so that the electric resistance value corresponding to the relative angle between the magnetization directions is exhibited by the giant magnetoresistance effect. The electric resistance value is detected as the magnitude of the detection current Id by the electrodes 5a and 5b. As a result, the relative angle between the magnetization directions of the first ferromagnetic layer 31 and the second ferromagnetic layer 32 can be detected, and the vector direction of the strain can be detected. Incidentally, the measurement method of the relative angle between the magnetization directions of the first ferromagnetic layer 31 and the second ferromagnetic layer 32 is not limited to the foregoing. For example, the following procedure is also acceptable: the stress detection layer 3 is applied with a constant current, thereby to detect the change in voltage depending upon the relative angle between the magnetization directions of the first ferromagnetic layer 31 and the second ferromagnetic layer 32; thus, the vector direction of the strain is detected from the change in voltage.

As described up to this point, with the stress sensor in accordance with the first embodiment, the magnetization direction of the second ferromagnetic layer is fixed by the strain-insensitive exchange bias caused by the exchange coupling with the antiferromagnetic layer. As a result, the relative angle between the magnetization directions of the first ferromagnetic layer 31 and the second ferromagnetic layer 32 at the time of the measurement of the strain is stabilized, and the operation stability of the stress sensor 10 is improved. Furthermore, the second ferromagnetic layer may only be for forming the exchange coupling between it and the antiferromagnetic layer. For this reason, the design freedom degree of the selection of materials for, and the shape/dimensions of the second ferromagnetic layer, and the like is improved. For example, even when the first ferromagnetic layer and the second ferromagnetic layer include the same material, and have the same shape, the stress sensor can be caused to function.

Manufacturing Method

Figure 4:
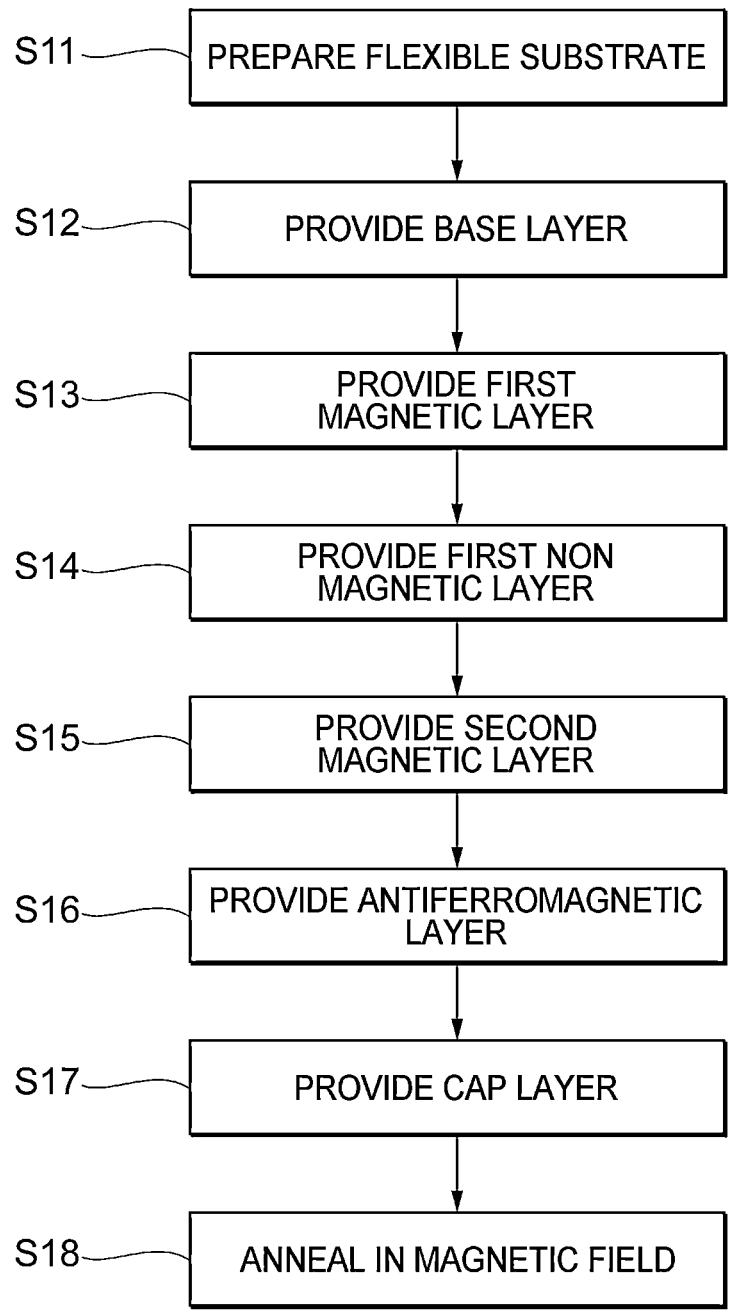
FIG. 4 is a flowchart schematically showing a method for manufacturing a stress sensor in accordance with the first embodiment.

Referring to FIG. 4, a description is provided for a method for manufacturing the stress sensor 10 in accordance with the first embodiment. FIG. 4 is a flowchart schematically showing the method for manufacturing a stress sensor in accordance with the first embodiment.

At S11, a flexible substrate is prepared. At S12, a base layer is provided on the flexible substrate. At S13, a first ferromagnetic layer is provided on the base layer. At S14, a first non-magnetic layer is provided on the first ferromagnetic layer. At S15, a second ferromagnetic layer is provided on the first non-magnetic layer. At S16, an antiferromagnetic layer is provided on the second ferromagnetic layer. Up to this point, the steps S13 to S16 correspond to the manufacturing steps of the stress detection layer. At S17, a cap layer is provided on the antiferromagnetic layer. The method for providing each layer in the steps S12 to S17 has no particular restriction, and can be appropriately selected from various deposition methods, for example, Physical Vapor Deposition methods such as a sputtering method, and molecular beam epitaxy (MBE), and Chemical Vapor Deposition methods such as metalloorganic chemical vapor deposition method (MOCVD) and an atomic layer deposition method (ALD).

Subsequent to the step of providing a cap layer at S17, a step of providing an electrode and a step of processing into an element shape may be carried out. Incidentally, the step of providing an electrode and the step of processing into an element shape may be carried out subsequent to the step of performing annealing in a magnetic field described later.

At S18, the stress detection layer is annealed together with the flexible substrate in a magnetic field (which is also referred to as "being applied with an external magnetic field"). In the present step S18, the to-be-treated objects (the second ferromagnetic layer and the antiferromagnetic layer) are subjected to a heat treatment in a magnetic field, and then, are further cooled to room temperature in the magnetic field. Specifically, the step of performing annealing in a magnetic field S18 may include a step of applying the to-be-treated objects in vacuum with an external magnetic field, a step of heating the to-be-treated objects being applied with an external magnetic field to the treatment temperature, a step of holding the to-be-treated objects being applied with an external magnetic field at the treatment temperature for just as long as the treatment time, and the step of cooling the to-be-treated objects being applied with an external magnetic field to room temperature. The term "room temperature" herein mentioned is, for example, about 0° C. to 40° C. Preferably, the conditions are set within the ranges of the external magnetic field of 0.05 T to 3 T, the treatment temperature of 150° C. to 500° C., and the treatment time of 10 minutes to 120 minutes. More preferably, the conditions are set within the ranges of the external magnetic field of 0.2 T to 2 T, the treatment temperature of 200° C. to 450° C., and the treatment time of 30 minutes to 60 minutes. The step of performing annealing in a magnetic field (S18) forms an exchange coupling between the second ferromagnetic layer and the antiferromagnetic layer, so that the magnetization direction of the second ferromagnetic layer is fixed according to the exchange bias magnetic field (Heb) applied on the second ferromagnetic layer. As described up to this point, when the stress detection layer can be deposited on the flexible substrate, and the second ferromagnetic layer and the antiferromagnetic layer can be annealed together with the flexible substrate, the manufacturing steps can be simplified as compared with the manufacturing method in which the annealed stress detection layer is transferred onto the flexible substrate.

In some aspects, in the step of performing annealing in a magnetic field (S18), it is essential only that at least the second ferromagnetic layer and the antiferromagnetic layer can be annealed in a magnetic field, and the step of performing annealing in a magnetic field (S18) may be carried out before the step of providing a cap layer (S17).

Example of First Embodiment

Figure 5:
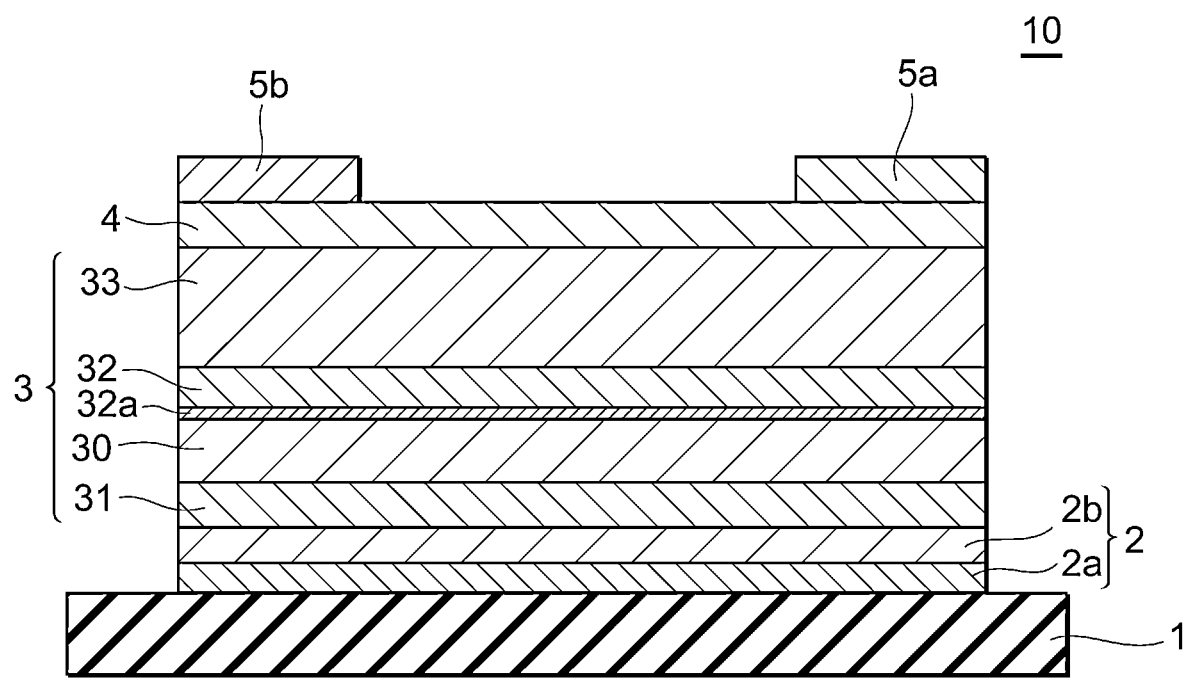
FIG. 5 is a cross sectional view schematically showing a configuration of a stress sensor in accordance with an example of the first embodiment.
Figure 6:
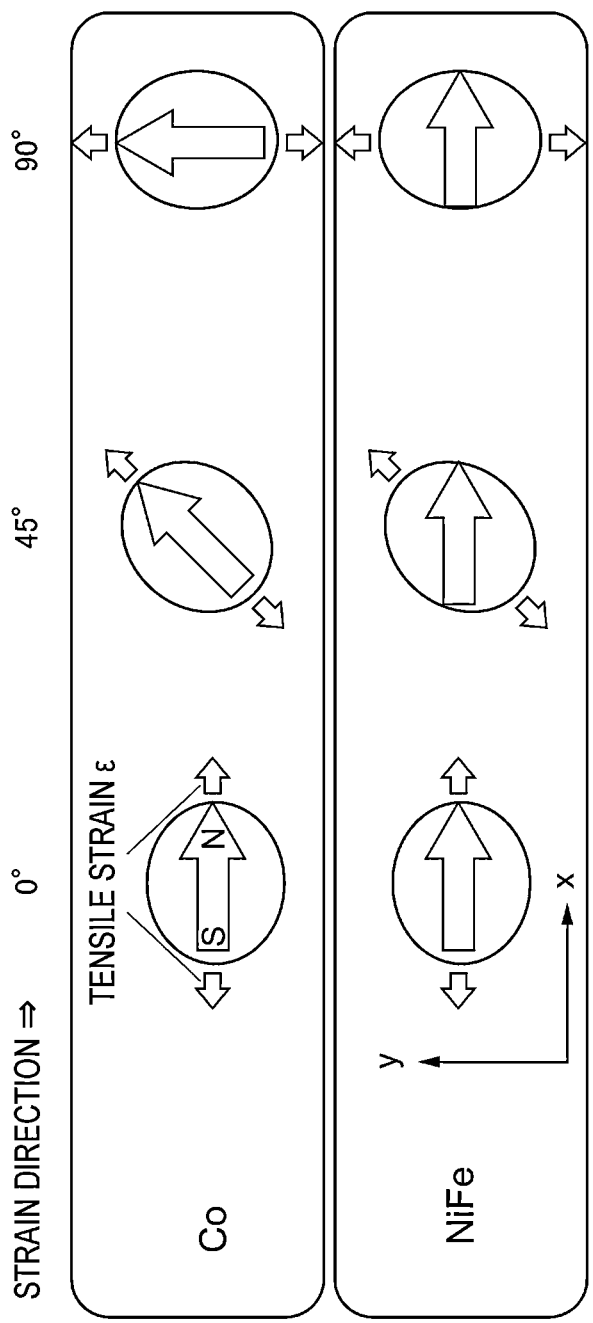
FIG. 6 is a view showing the relationship between the strain direction and the magnetization direction of the stress sensor in accordance with an example of the first embodiment.
Figure 7:
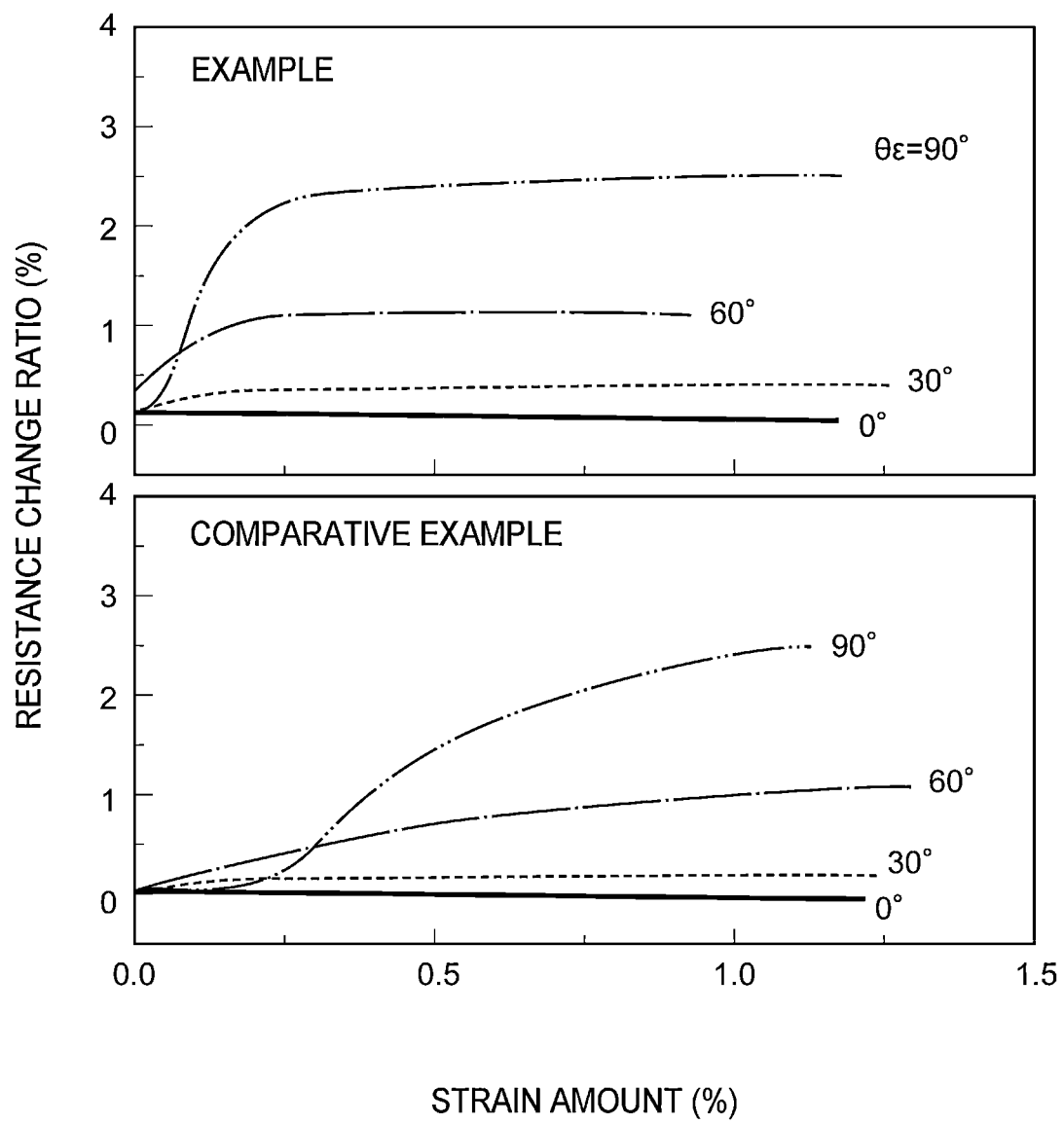
FIG. 7 is a graph showing the relationship between the strain amount and the resistance change ratio in the example and a comparative example of the first embodiment.

Referring to FIGS. 5 to 7, an overarching example of the stress sensor in accordance with the first embodiment of the present disclosure is provided. FIG. 5 is a cross sectional view schematically showing a configuration of the stress sensor in accordance with the overarching example of the first embodiment. FIG. 6 is a view showing the relationship between the strain direction and the magnetization direction of the stress sensor in accordance with the overarching example of the first embodiment. FIG. 7 is a graph showing each relationship between the strain amount and the resistance change ratio in the overarching example and a comparative example of the first embodiment. The horizontal axis of FIG. 7 is the strain amount (%), and the vertical axis is the resistance change ratio (%). Incidentally, the present disclosure is not limited to the example.

A stress sensor 10 of the present embodiment includes a substrate 1, a base layer 2a deposited on the substrate 1, a base layer 2b deposited on the base layer 2a, a first ferromagnetic layer 31 deposited on the base layer 2b, a first non-magnetic layer 30 deposited on the first ferromagnetic layer 31, an additional second ferromagnetic layer 32a deposited on the first non-magnetic layer 30, a second ferromagnetic layer 32 deposited on the additional second ferromagnetic layer 32a, an antiferromagnetic layer 33 deposited on the second ferromagnetic layer 32, a protective layer 4 deposited on the antiferromagnetic layer 33, and electrodes 5a and 5b deposited apart from each other on the protective layer 4.

The materials and the film thicknesses of respective layers forming the stress sensor 10 of the overarching example are as follows:
Substrate 1: polyimide film (UPILEX (registered trademark) manufactured by UBE Industries, Ltd.)
Base layer 2a: 2.2 nm Ta
Base layer 2b: 2.0 nm Pt
First ferromagnetic layer 31: 2.1 nm Co
First non-magnetic layer 30: 4.0 nm Cu
Additional second ferromagnetic layer 32a: 0.5 nm Co
Second ferromagnetic layer 32: 2.0 nm NiFe
Antiferromagnetic layer 33: 10.0 nm FeMn
Protective layer 4: 2.2 nm Pt
Electrodes 5a and 5b: conductive epoxy resin The main difference of the stress sensor of the comparative example from the stress sensor 10 of the overarching example resides in that no inclusion of the antiferromagnetic layer and application of a weak auxiliary magnetic field cause the second ferromagnetic layer to function as a strain-insensitive layer. The materials and the film thicknesses of respective layers forming the stress sensor of the comparative example are specifically as follows:
Substrate :polyethylene naphthalate
Base layer: 2.5 nm Ta
Base layer: 2.0 nm Pt
First ferromagnetic layer: 3.5 nm Co (strain sensitive layer)
First non-magnetic layer: 4.0 nm Cu
Additional second ferromagnetic layer: 0.4 nm Co
Second ferromagnetic layer: 3.8 nm NiFe (strain insensitive layer)
Protective layer: 2.0 nm Cu
Electrodes 5a and 5b: conductive epoxy resin In the overarching example, as shown in FIG. 6, the NiFe layer of a strain insensitive layer does not change in magnetization direction even when applied with a stress. On the other hand, the Co layer of a strain sensitive layer is directed in parallel with the stress direction. The stress sensors of the overarching example and the comparative example were designed so that the relative angle between the magnetization directions of the NiFe layer and the Co layer in the initial state (strain amount =0%) becomes 0°. As shown in FIG. 7, a tension strain was applied in tension directions of 0°, 30°, 60°, and 90° with respect to the magnetization directions of the NiFe layer and the Co layer in the initial state, thereby measuring the resistance change ratio with a strain amount in the range of about 0% to 1.0%.

When the strain amount is less than 1.0%, the difference in resistance change ratio depends upon the change in direction of the tension strain in the overarching example being larger than in the comparative example. As specific examples, when the strain amount is 0.3%, a significant difference is observed between the resistance change ratio at a tension direction of 60° and the resistance change ratio at a tension direction of 90° in the overarching example, but a significant difference was not observed between the resistance change ratio at a tension direction of 60° and the resistance change ratio at a tension direction of 90° in the comparative example. Thus, the direction of tension strain can be detected with the stress sensor of the overarching example even with a minute strain amount with which the direction of tension strain is difficult to detect with the stress sensor of the comparative example.

Below, a description will be given to the configurations of the stress sensors in accordance with other embodiments of the present disclosure. Incidentally, in the following embodiments, the common matters to the first embodiment will not be described, and only different points will be described. Particularly, the same advantageous effects due to the same configuration will not be sequentially mentioned.

Second Embodiment

Figure 8:
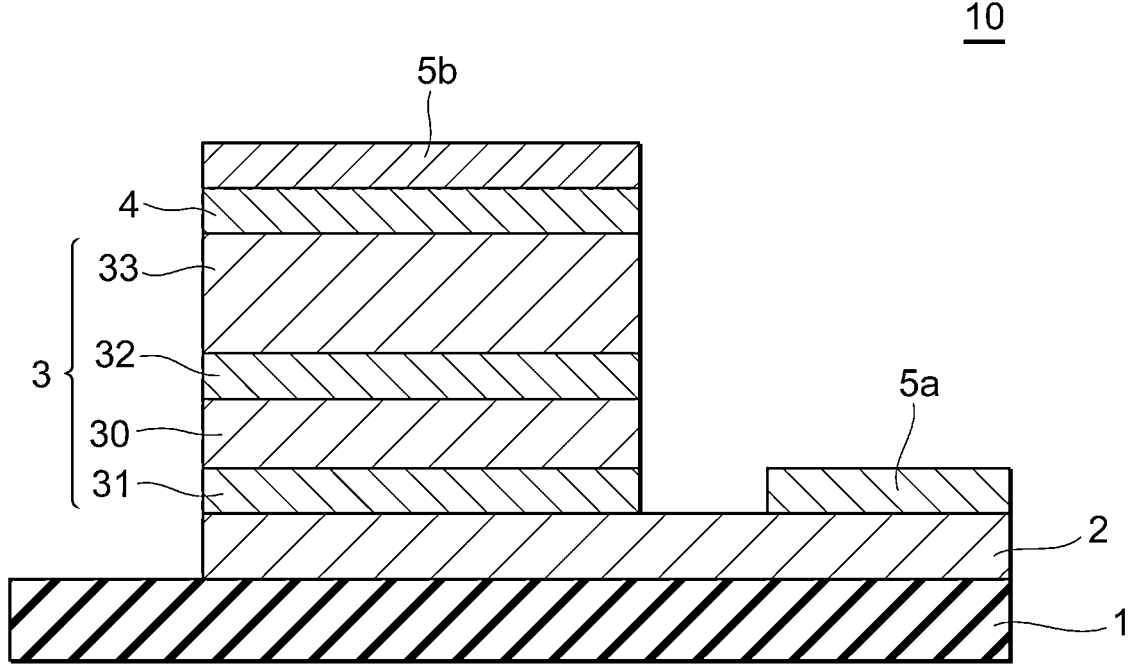
FIG. 8 is a cross sectional view schematically showing a configuration of a stress sensor in accordance with a second embodiment.

Referring to FIG. 8, a description will be given to the configuration of a stress sensor 10 in accordance with a second embodiment. FIG. 8 is a cross sectional view schematically showing the configuration of the stress sensor in accordance with the second embodiment.

The difference of the second embodiment from the first embodiment resides in that the electrode 5a is formed on the base layer 2, and at a position apart from the stress detection layer 3, and that the electrode 5b is formed on the protective layer 4. When a voltage is applied across the electrode 5a and the electrode 5b, a current flows along the direction perpendicular to the interface of respective layers of the stress detection layer 3. Accordingly, the giant magnetoresistance effect can be detected. Incidentally, the configurations of the electrodes 5a and 5b have no particular restriction so long as the current flowing along the direction perpendicular to the interface of respective layers of the stress detection layer 3 can be detected. For example, the base layer 2 may be used as the electrode 5a, and the protective layer 4 may be used as the electrode 5b.

Third Embodiment

Figure 9:
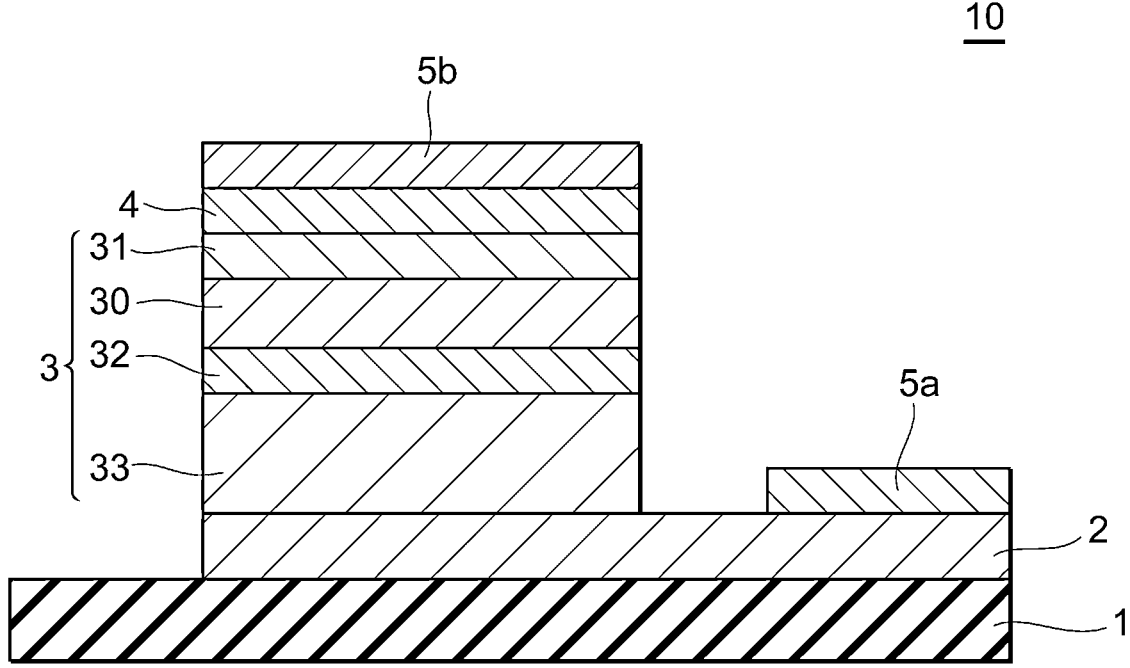
FIG. 9 is a cross sectional view schematically showing a configuration of a stress sensor in accordance with a third embodiment.

Referring to FIG. 9, a description will be given to the configuration of a stress sensor 10 in accordance with a third embodiment. FIG. 9 is a cross sectional view schematically showing the configuration of the stress sensor in accordance with the third embodiment.

The difference of the third embodiment from the second embodiment resides in that the structure of the stress detection layer 3 is inverted upside down. Specifically, the antiferromagnetic layer 33 is provided on the base layer 2, the second ferromagnetic layer 32 is provided on the antiferromagnetic layer 33, the first non-magnetic layer 30 is provided on the second ferromagnetic layer 32, and the first ferromagnetic layer 31 is provided on the first non-magnetic layer 30.

Fourth Embodiment

Figure 10:
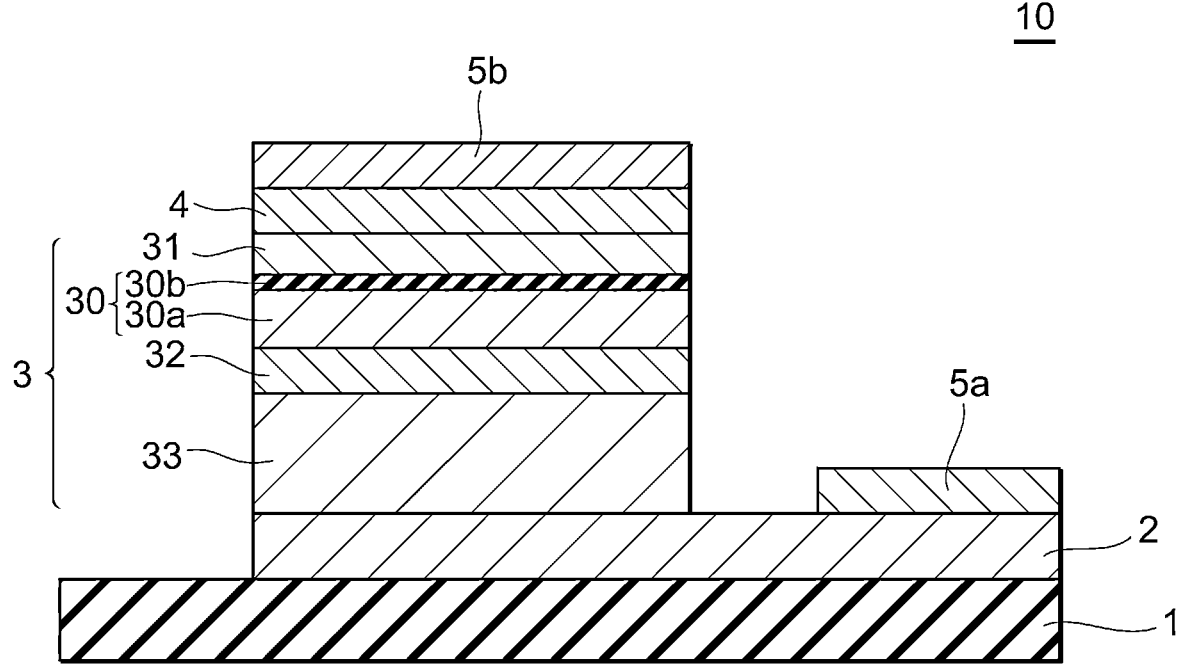
FIG. 10 is a cross sectional view schematically showing a configuration of a stress sensor in accordance with a fourth embodiment.

Referring to FIG. 10, a description will be given to the configuration of a stress sensor 10 in accordance with a fourth embodiment. FIG. 10 is a cross sectional view schematically showing the configuration of the stress sensor in accordance with the fourth embodiment.

The difference of the fourth embodiment from the third embodiment resides in that the first non-magnetic layer 30 has a multilayer structure including a metal layer 30a and an insulator layer 30b. In other words, the first non-magnetic layer 30 includes a combination of a metal and an insulator. The thickness of the insulator layer 30b is preferably thin enough for the tunnel current to flow, and is preferably set at 5 nm or less. The insulator layer 30b is, for example, a natural oxide film of the metal layer 30a, and the first non-magnetic layer 30 is in a passive state for the metal layer 30a. When the first non-magnetic layer 30 may include a natural oxide film, for example, at the stage of providing the metal layer 30a, a processing step requiring atmosphere exposure such as photolithography can be carried out.

Fifth Embodiment

Figure 11:
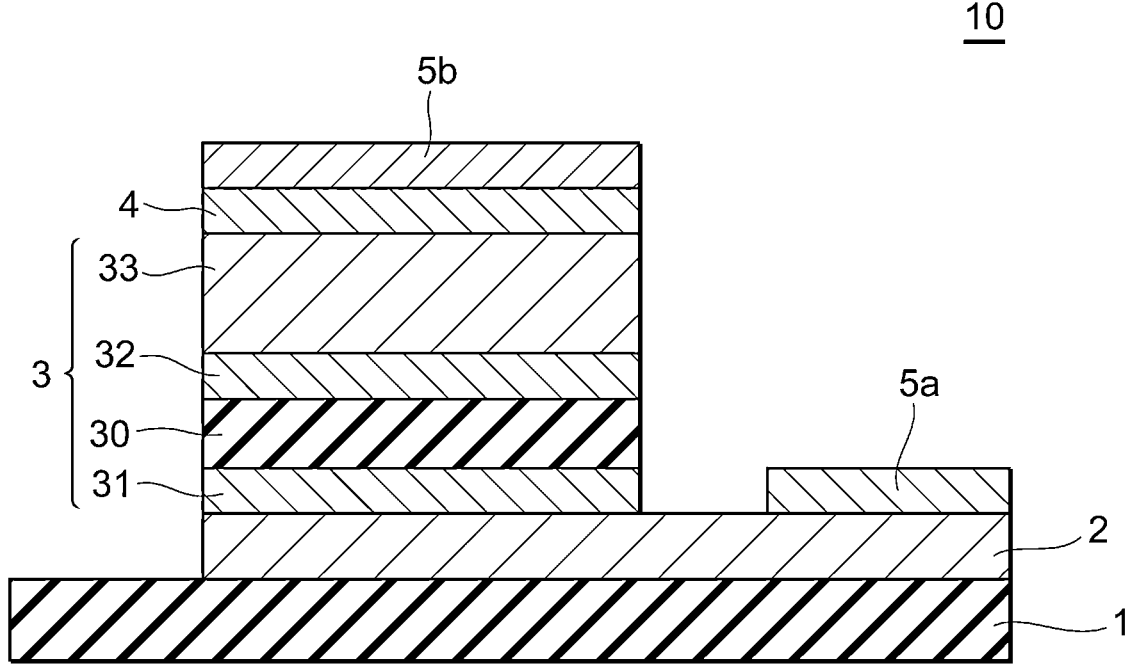
FIG. 11 is a cross sectional view schematically showing a configuration of a stress sensor in accordance with a fifth embodiment.

Referring to FIG. 11, a description will be given to the configuration of a stress sensor 10 in accordance with a fifth embodiment. FIG. 11 is a cross sectional view schematically showing the configuration of the stress sensor in accordance with the fifth embodiment.

The difference of the fifth embodiment from the second embodiment resides in that the first non-magnetic layer 30 includes an insulator. The stress sensor 10 in accordance with the fifth embodiment uses the tunneling magnetoresistance effect. Therefore, as with the insulator layer 30b of the third embodiment, the thickness of the first non-magnetic layer 30 of the fourth embodiment is preferably set at 5 nm or less. As one example of the preferable configuration for obtaining a high resistance change ratio by the tunneling magnetoresistance effect, the first ferromagnetic layer 31 and the second ferromagnetic layer 32 include CoFeB, and the first non-magnetic layer 30 includes MgO.

Sixth Embodiment

Figure 12:
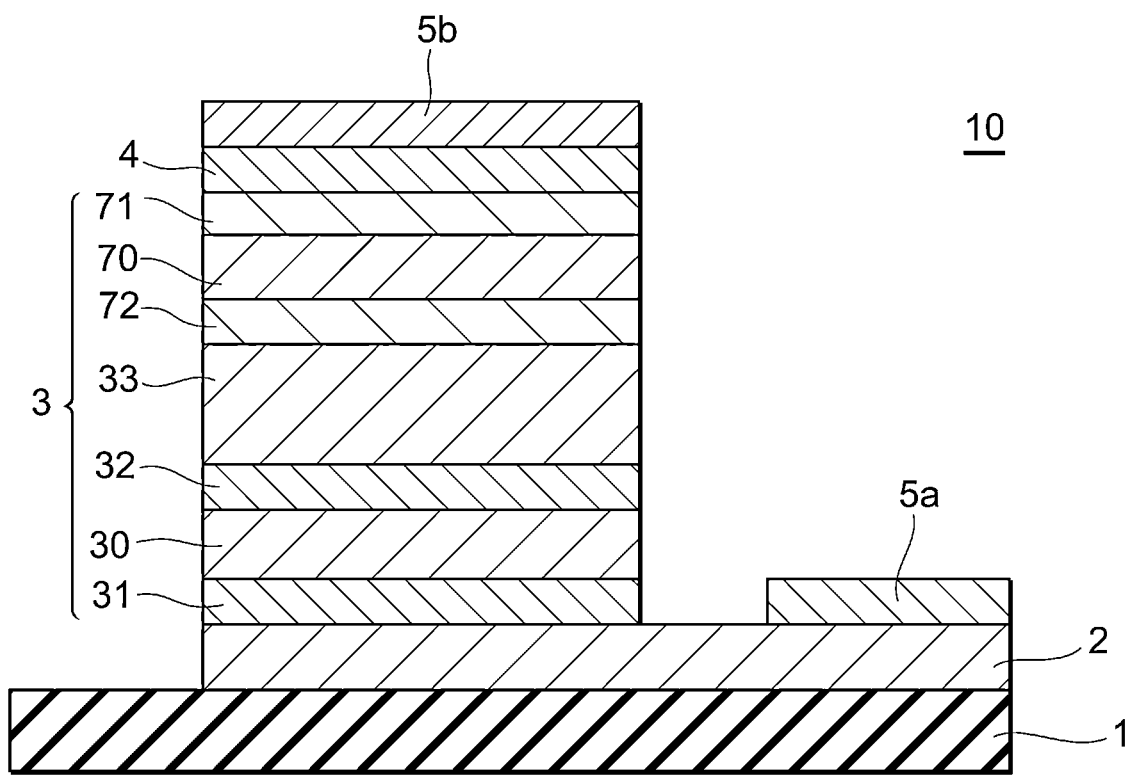
FIG. 12 is a cross sectional view schematically showing a configuration of a stress sensor in accordance with a sixth embodiment.

Referring to FIG. 12, a description will be given to the configuration of a stress sensor 10 in accordance with a sixth embodiment. FIG. 12 is a cross sectional view schematically showing the configuration of the stress sensor in accordance with the sixth embodiment.

The difference of the sixth embodiment from the second embodiment resides in that a fourth ferromagnetic layer 72, a second non-magnetic layer 70, and a third ferromagnetic layer 71 are further included sequentially from the antiferromagnetic layer 33 side (lower layer) between the antiferromagnetic layer 33 and the protective layer 4. The magnetization direction of the fourth ferromagnetic layer 72 is fixed by the exchange bias caused by the exchange coupling with the antiferromagnetic layer 33. As a result, the resistance change ratio can be increased.

Seventh Embodiment

Figure 13:
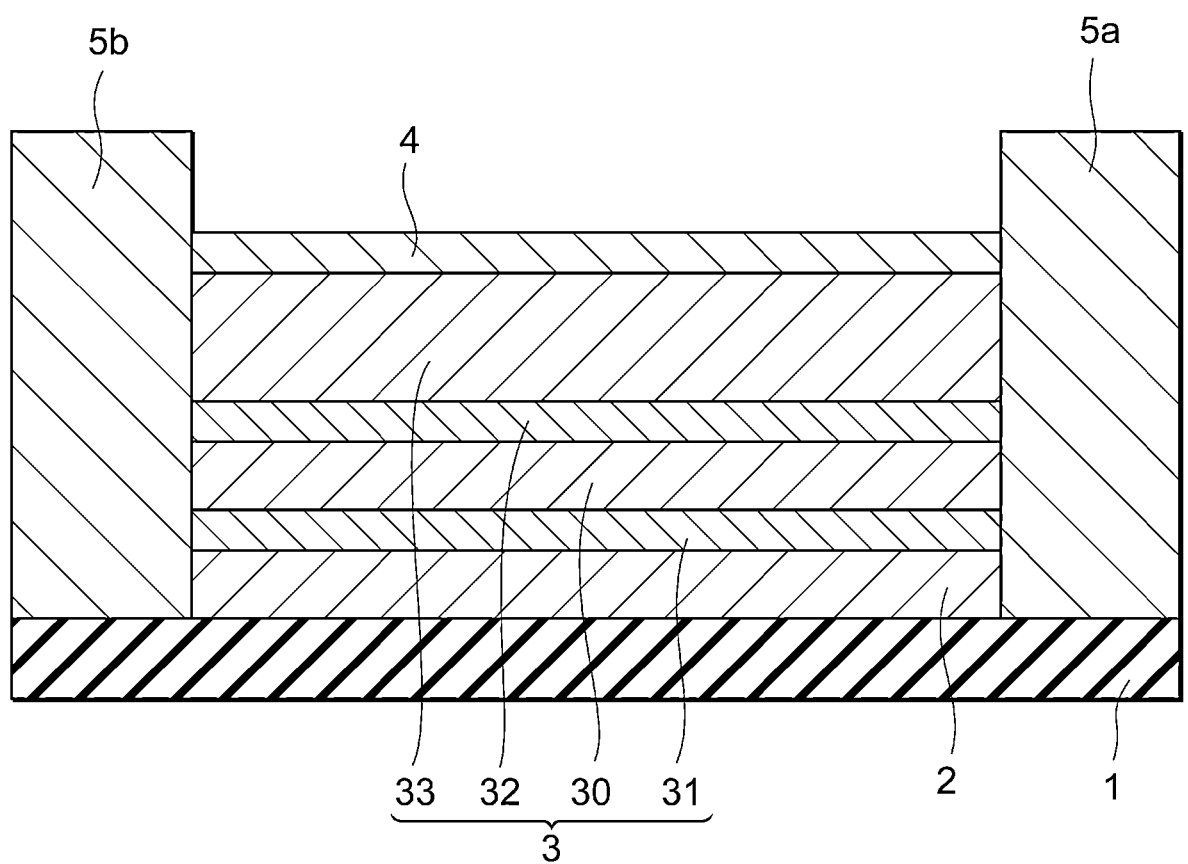
FIG. 13 is a cross sectional view schematically showing a configuration of a stress sensor in accordance with seventh embodiment.

Referring to FIG. 13, a description will be given to the configuration of a stress sensor 10 in accordance with a seventh embodiment. FIG. 13 is a cross sectional view schematically showing the configuration of the stress sensor in accordance with the seventh embodiment.

The difference of the seventh embodiment from the first embodiment resides in that the electrodes 5a and 5b are formed at the side part of the stress detection layer 3. When a voltage is applied across the electrode 5a and the electrode 5b, resultantly, a current flows into all the layers of the stress detection layer 3. Accordingly, the giant magnetoresistance effect can be detected.

Up to this point, the exemplary embodiments and examples of the present disclosure were described. Below, a part or the whole of the embodiments of the present disclosure will be added. Incidentally, the present disclosure is not limited to the following configuration.

In accordance with one aspect of the present disclosure, the stress sensor 10 is provided which includes the stress detection layer 3 including a laminated body including the first ferromagnetic layer 31, the first non-magnetic layer 30, the second ferromagnetic layer 32, and the antiferromagnetic layer 33 stacked one on another, in which the antiferromagnetic layer 33 includes Mn, and the magnetization direction of the second ferromagnetic layer 32 is fixed by the exchange bias caused by the exchange coupling with the antiferromagnetic layer 33. The stress sensor 10 detects a stress by the electric resistance depending upon the relative angle between the magnetization directions of first ferromagnetic layer 31 and the second ferromagnetic layer 32 changing depending upon the externally applied stress.

As a result of this, the stress is detected by detecting the electric resistance depending upon the relative angle between the magnetization directions of first ferromagnetic layer 31 and the second ferromagnetic layer 32 changing depending upon the externally applied stress. At this step, the magnetization direction of the second ferromagnetic layer 32 is fixed by the strain-insensitive exchange bias caused by the exchange coupling with the antiferromagnetic layer 33. As a result of this, the relative angle between the magnetization directions of the first ferromagnetic layer 31 and the second ferromagnetic layer 32 at the time of the strain measurement is stabilized, and the operation stability of the stress sensor 10 is improved. Further, the second ferromagnetic layer 32 may only be the one for forming the exchange coupling between it and the antiferromagnetic layer 33. For this reason, the design freedom degree of the selection of materials for, and the shape/dimensions of the second ferromagnetic layer 32, and the like is improved. For example, even when the first ferromagnetic layer 31 and the second ferromagnetic layer 32 include the same material, and have the same shape, the stress sensor can be caused to function.

As one aspect, when the first ferromagnetic layer 31 and the second ferromagnetic layer 32 are in the initial state in which no stress is applied thereto, the magnetization directions thereof are arrayed in parallel or in antiparallel with each other.

By thus aligning the magnetization directions in the initial state in parallel or in antiparallel with each other, the electric resistance of the stress sensor 10 is maximized or minimized in the initial state. Therefore, the difference in electric resistance between the case where a stress is applied thereto, and the initial state becomes clear, resulting in an improvement of the stress detection sensitivity.

As one aspect, the stress detection layer 3 further includes a third ferromagnetic layer 71, a second non-magnetic layer 70, and a fourth ferromagnetic layer 72 in addition to the laminated body, and the magnetization direction of the third ferromagnetic layer 71 is fixed by the exchange bias caused by the exchange coupling with the antiferromagnetic layer 33.

As a result of this, the resistance change ratio increases and the stress detection sensitivity is improved.

As one aspect, the stress sensor 10 further has the substrate 1 for supporting the stress detection layer 3. Preferably, the substrate 1 is a flexible substrate.

Accordingly, when the stress sensor 10 is applied with a stress, the stress detection layer 3 becomes susceptible to a tensile stress or a compression stress, resulting in an improvement of the stress detection sensitivity.

As one aspect, the first ferromagnetic layer 31 is provided on the substrate 1 side of the first non-magnetic layer 30, and the second ferromagnetic layer 32 and the antiferromagnetic layer 33 are provided on the side opposite to the substrate 1 side of the first non-magnetic layer 30.

As one aspect, the first ferromagnetic layer 31 and the second ferromagnetic layer 32 include a metal magnetic body. The first ferromagnetic layer 31 and the second ferromagnetic layer 32 include an alloy including Fe, Co, or Ni, or an alloy including at least one thereof This can implement a stress sensor using the giant magnetoresistance effect.

As one aspect, the first non-magnetic layer 30 is a metal or an insulator, or a combination thereof.

This can implement a stress sensor using the giant magnetoresistance effect or the tunneling magnetoresistance effect.

In accordance with another aspect of the present disclosure, a method for manufacturing a stress sensor is provided which includes a step of providing a first ferromagnetic layer (S13), a step of providing a non-magnetic layer (S14), a step of providing a second ferromagnetic layer (S15), a step of providing an antiferromagnetic layer (S16), and a step of annealing at least the second ferromagnetic layer and the antiferromagnetic layer in a magnetic field (S18), in which the step of performing annealing in a magnetic field further includes a step of heat treating a to-be-treated object in a magnetic field, and then, further cooling the object to room temperature in a magnetic field, in the step of performing annealing in a magnetic field (S18), an exchange coupling is formed between the second ferromagnetic layer and the antiferromagnetic layer, and the magnetization direction of the second ferromagnetic layer is fixed by the exchange bias caused by the exchange coupling, and the stress sensor detects the stress by the electric resistance depending upon the relative angle between the magnetization directions of the first ferromagnetic layer and the second ferromagnetic layer changing depending upon the externally applied stress.

With this configuration, the stress can be detected by detecting the electric resistance depending upon the relative angle between the magnetization directions of the first ferromagnetic layer 31 and the second ferromagnetic layer 32 changing depending upon the externally applied stress, and a stress sensor improved in operation stability can be manufactured.

In one aspect, the method further includes a step of preparing a flexible substrate (S11). The first ferromagnetic layer, the non-magnetic layer, the second ferromagnetic layer, and the antiferromagnetic layer are respectively deposited on the flexible substrate. In the step of performing annealing in a magnetic field (S18), the flexible substrate is also annealed together.

With this configuration, the manufacturing steps can be more simplified as compared with the manufacturing method in which the annealed stress detection layer is transferred to the flexible substrate.

As described up to this point, in accordance with one aspect of the present disclosure, a stress sensor improved in operation stability, and a manufacturing method therefor can be provided.

Incidentally, the embodiments described up to this point are for facilitating understanding of the present disclosure, and are not for construing the present disclosure in a limited manner. The present disclosure can be changed/modified without departing from the gist thereof, and the present disclosure includes the equivalents thereof. Namely, those obtained by appropriately adding design changes to each embodiment by those skilled in the art are also included within the scope of the present disclosure so long as they have the features of the present disclosure. For example, each element included in each embodiment, and the arrangement, materials, conditions, shape, size, and the like thereof are not limited to the exemplified ones, and can be appropriately changed. Further, respective elements included in respective embodiments can be combined so long as the combinations are technically possible. The combinations thereof are also included within the scope of the present disclosure so long as they include the features of the present disclosure.

The invention claimed is:

1. A stress sensor comprising:
a stress detection layer including a laminated body including a first ferromagnetic layer, a first non-magnetic layer, a second ferromagnetic layer, and an antiferromagnetic layer stacked one on another, wherein:
the antiferromagnetic layer includes Mn,
a magnetization direction of the second ferromagnetic layer is fixed by an exchange bias caused by an exchange coupling with the antiferromagnetic layer, and
the stress sensor detects a stress by an electric resistance depending upon a relative angle between magnetization directions of the first ferromagnetic layer and the second ferromagnetic layer, the relative angle changing depending upon an externally applied stress,
wherein the electric resistance is detected by a magnitude of a detection current flowing into all layers of the stress detection layer.

2. The stress sensor according to claim 1, wherein magnetization directions of the first ferromagnetic layer and the second ferromagnetic layer are arrayed in parallel or antiparallel with each other in an initial state in which stress is not applied.

3. The stress sensor according to claim 2, wherein the electric resistance increases when the magnetization directions of the first ferromagnetic layer and the second ferromagnetic layer changes from parallel to antiparallel.

4. The stress sensor according to claim 1, further comprising a substrate for supporting the stress detection layer.

5. The stress sensor according to claim 4, wherein the substrate is a flexible substrate.

6. The stress sensor according to claim 4, wherein:
the first ferromagnetic layer is provided on a substrate side of the first non-magnetic layer, and
the second ferromagnetic layer and the antiferromagnetic layer are provided on an opposite side of the substrate side of the first non-magnetic layer.

7. The stress sensor according to claim 1, wherein the first ferromagnetic layer and the second ferromagnetic layer comprise a metal magnetic body.

8. The stress sensor according to claim 7, wherein the first ferromagnetic layer and the second ferromagnetic layer comprise Fe, Co, or Ni, or an alloy including at least one of Fe, Co, and Ni.

9. The stress sensor according to claim 1, wherein the first non-magnetic layer comprises a metal or an insulator, or a combination thereof.

10. The stress sensor according to claim 1, wherein the detection current is fed through a first electrode and a second electrode on the stress sensor by applying a voltage across the first electrode and the second electrode.

11. The stress sensor according to claim 10, wherein a protective layer is stacked on the stress detection layer and the first and second electrode are provided on the protective layer.

12. The stress sensor according to claim 10, wherein the stress detection layer is stacked on a base layer and a protective layer is stacked on the stress detection layer, wherein the first electrode is formed on the protective layer and the second electrode is formed on the base layer.

13. A stress sensor comprising:
a stress detection layer including a laminated body including a first ferromagnetic layer, a first non-magnetic layer, a second ferromagnetic layer, and an antiferromagnetic layer stacked one on another, wherein:

the antiferromagnetic layer includes Mn, a magnetization direction of the second ferromagnetic layer is fixed by an exchange bias caused by an exchange coupling with the antiferromagnetic layer, and the stress sensor detects a stress by an electric resistance depending upon a relative angle between magnetization directions of the first ferromagnetic layer and the second ferromagnetic layer, the relative angle changing depending upon an externally applied stress, wherein:

the stress detection layer further includes a third ferromagnetic layer, a second non-magnetic layer, and a fourth ferromagnetic layer, in addition to the laminated body, and a magnetization direction of the third ferromagnetic layer is fixed by an exchange bias caused by an exchange coupling with the antiferromagnetic layer.

14. A method for manufacturing a stress sensor, the method comprising:

performing annealing of at least a second ferromagnetic layer and an antiferromagnetic layer of the stress sensor in a magnetic field, wherein the performing of the annealing in the magnetic field comprises:

heat treating the second ferromagnetic layer and the antiferromagnetic layer in the magnetic field, cooling the second ferromagnetic layer and the antiferromagnetic layer to room temperature in the magnetic field, forming an exchange coupling between the second ferromagnetic layer and the antiferromagnetic layer, and fixing a magnetization direction of the second ferromagnetic layer by an exchange bias caused by the exchange coupling, and wherein the stress sensor detects a stress by an electric resistance depending upon a relative angle between magnetization directions of a first ferromagnetic layer and the second ferromagnetic layer, the relative angle changing depending upon an externally applied stress.

15. The method according to claim 14, further comprising:

depositing the first ferromagnetic layer, a non-magnetic layer, the second ferromagnetic layer, and the antiferromagnetic layer over a flexible substrate, and wherein, during the performing of the annealing in the magnetic field, the flexible substrate is annealed together with the second ferromagnetic layer and the antiferromagnetic layer.

16. The method according to claim 15, wherein the first ferromagnetic layer, the non-magnetic layer, the second ferromagnetic layer, and the antiferromagnetic layer together comprise a stress detection layer; and the method further comprises:

forming a base layer between the flexible substrate and the stress detection layer;

forming a protective layer on the stress detection layer; and forming a first electrode and a second electrode on the protective layer, wherein the electric resistance is detected by a magnitude of a detection current flowing into all layers of the stress detection layer via the first electrode and the second electrode.

17. The method according to claim 14, wherein the performing of the annealing in the magnetic field further comprises:

heat treating the second ferromagnetic layer and the antiferromagnetic layer to a treatment temperature; and holding the second ferromagnetic layer and the antiferromagnetic layer at the treatment temperature for a treatment time.

18. The method according to claim 14, wherein magnetization directions of the first ferromagnetic layer and the second ferromagnetic layer are arrayed in parallel or antiparallel with each other in an initial state in which stress is not applied.

19. The method according to claim 18, wherein the electric resistance increases when the magnetization directions of the first ferromagnetic layer and the second ferromagnetic layer changes from parallel to antiparallel.

* * * * *